(12) United States Patent
Pande et al.

(10) Patent No.: US 7,683,568 B2
(45) Date of Patent: Mar. 23, 2010

(54) MOTOR DRIVE USING FLUX ADJUSTMENT TO CONTROL POWER FACTOR

(75) Inventors: Manish Pande, Cambridge (CA); Yunwei Li, Edmonton (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 346 days.

(21) Appl. No.: 11/863,514

(22) Filed: Sep. 28, 2007

(65) Prior Publication Data
US 2009/0085510 A1 Apr. 2, 2009

(51) Int. Cl.
*H02P 1/24* (2006.01)
(52) U.S. Cl. ............... 318/729; 318/438; 318/800; 318/801; 363/34; 363/35; 363/37
(58) Field of Classification Search ........... 318/729, 318/800, 801, 805, 812, 814, 825, 438, 772, 318/779; 363/34, 35, 37, 89, 97
See application file for complete search history.

(56) References Cited

U.S. PATENT DOCUMENTS

| | | | |
|---|---|---|---|
| 5,206,575 A * | 4/1993 | Nakamura et al. ......... | 318/807 |
| 6,850,426 B2 * | 2/2005 | Kojori et al. .............. | 363/123 |
| 7,049,774 B2 * | 5/2006 | Chin et al. ................ | 318/438 |
| 7,495,410 B2 * | 2/2009 | Zargari et al. ............ | 318/729 |
| 2007/0108771 A1 * | 5/2007 | Jones et al. .............. | 290/44 |
| 2007/0114962 A1 * | 5/2007 | Grbovic .................... | 318/772 |

OTHER PUBLICATIONS

Tolbert, Leon M., et al., Modulation Index Regulation of a Multilevel Inverter for Static Var Compensation, Power Engineering Society General Meeting, 2003, IEEE, Jul. 13-17, 2003, Vo. 1, pp. 1-6, Piscataway, NJ, USA.

* cited by examiner

*Primary Examiner*—Bentsu Ro
*Assistant Examiner*—Thai Dinh
(74) *Attorney, Agent, or Firm*—Boyle Fredrickson LLP; Alexander R. Kuszewski

(57) ABSTRACT

The switching rectifier and switching inverter on a motor drive unit are modulated to indirectly change the magnitude of current and voltage stored in DC link by controlling the magnetic field of the motor to correct for both power factor lead and power factor lag over a wide range of motor speeds and conditions while maintaining a predetermined motor operating point.

22 Claims, 5 Drawing Sheets

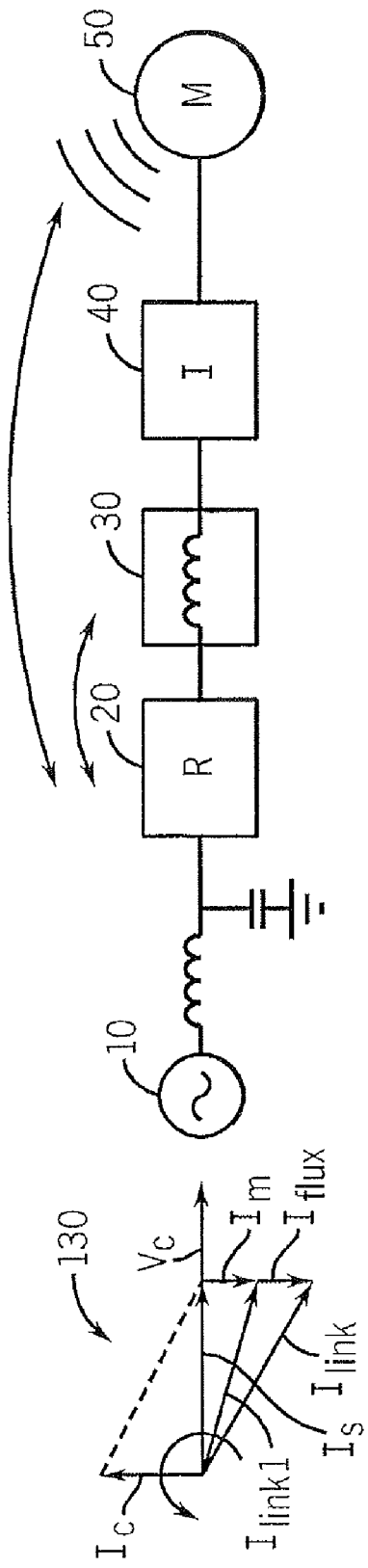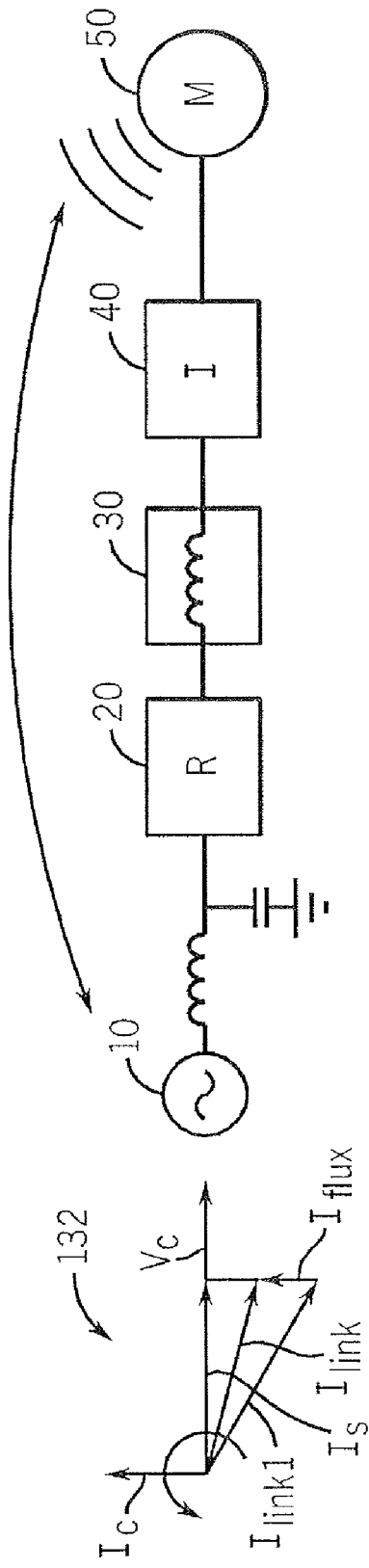
FIG. 6
FIG. 7

MOTOR DRIVE USING FLUX ADJUSTMENT TO CONTROL POWER FACTOR

STATEMENT REGARDING FEDERALLY SPONSORED RESEARCH OR DEVELOPMENT

--

CROSS REFERENCE TO RELATED APPLICATION

BACKGROUND OF THE INVENTION

The present invention relates generally to electrical motor drives, and more particularly to systems and methods for controlling power factor in motor drive systems.

Adjustable speed motor drives are power conversion systems that operate to provide power to electric motors in a controlled fashion to control one or more motor performance parameters, such as speed, torque, etc.

Medium voltage current-sourced type motor drives typically receive multiphase AC input power in the range of about 2,400 to 6,900 volts, which is converted to DC power, referred to as a DC link, and provided to an inverter stage. The inverter switches the DC link current to provide AC output current to a motor load (typically a synchronous motor or a induction motor) with the output current being controlled by the inverter in closed loop fashion to drive the motor at a desired speed and/or torque. The rectifier is generally an active switching type rectifier that selectively activates switches to provide current from the AC input to the DC link bus to achieve AC to DC power conversion, where the rectifier gain is controlled to provide a DC link current level required by the motor at any given time. The inverter, in turn, implements a switching scheme to selectively connect the motor leads to the DC link bus terminals to provide motor phase currents with controlled amplitudes, phase, and frequency to implement a particular motor control strategy based on motor performance feedback values and desired performance setpoints or profiles.

The use of an active front-end rectifier in the drive, however, causes a non-unity leading power factor, particularly during light loading conditions (e.g. low motor speeds with a fan/pump type load) because of the filter capacitors associated with the AC input. This is particularly undesirable in situations where the AC input is provided by a generator, where the leading power factor can cause generator instability. Thus, there remains a need for motor drive systems and control techniques by which improved power factor control can be achieved.

U.S. patent application Ser. No. 11/668,851 filed Jan. 30, 2007, not admitted prior art, assigned to the assignee of the present invention and hereby incorporated by reference, describes a method of correcting a leading power factor (where current leads voltage) of a motor drive system caused principally by input capacitors associated with the AC input to the drive. The correction of the leading power factor is done by controlling the rectifier and inverter to store and release energy from the inductors of the DC link to produce compensating currents. This technique is termed "modulation index regulation".

Modulation index regulation is not effective at high speed where, for example, "selective harmonic elimination" (SHE) or other inverter modulation techniques requiring fixed modulation are used.

SUMMARY OF THE INVENTION

The present inventors have recognized that flux control may be more broadly used to correct for both leading and lagging power factors and thus may be used instead of, or to augment, modulation index regulation, the latter which can be used to correct for only leading power factors. Because the amount of power factor correction that can be done by flux control is limited, in the preferred embodiment, flux control is teamed with modulation index regulation (which provides for more substantial correction of leading power factor required at lower motor speeds) to provide control of both leading and lagging power factors at a range of speeds.

Specifically the present invention provides a motor drive system providing power factor compensation including a switching rectifier system receiving a source of AC power to selectively couple the AC power with an intermediate DC link to provide a DC link current and an inverter coupled to the DC link to receive the DC link current and to synthesize an AC output current to a motor. A controller coupled to the switching rectifier system and the inverter executes a stored program to: (1) receive an operating command describing a desired operating point of the motor; (2) determine a power factor of the motor drive at the desired operating point; (3) determine a compensating current tending to correct the power factor to unity; (4) generate an AC output current to the motor providing the desired operating point of the motor and also producing the compensating current by changing the magnitude of the motor flux in the motor.

Thus it is one object of the invention to use the existing inverter of a motor drive and the flux field of the motor to generate compensating currents to counteract nonunity power factors.

The compensating current may correct a lagging power factor.

It is thus another object of the invention to correct for lagging power factors such as is not possible with modulation index regulation.

In the case of correcting for a lagging power factor, the controller may determine whether the current magnetic flux of the motor is less than a threshold value and increase the flux if the current magnetic flux of the motor is less than the threshold value and decrease the flux otherwise.

It is thus another object of the invention to determine whether the flux should be increased or decreased in order to compensate a lagging power factor.

The increasing and decreasing may be done by a closed loop integrating control process.

It is thus another object of the invention to allow correction without exact knowledge of the functional relationship between compensating current and power factor correction.

The compensating current may alternatively or in addition correct a leading power factor.

Thus it is an object of the invention to provide a compensation system that may handle both leading and lagging power factors.

For a leading power factor, the controller may determine whether the current magnetic flux of the motor is less than a threshold value, decreasing the flux if the current magnetic flux of the motor is less than the threshold value and increasing the flux otherwise.

It is thus an object of the invention to determine whether the flux should be increased or decreased in order to compensate a leading power factor.

The controller may further generate a compensating current by directly changing the magnitude of current stored in the DC link as controlled by the switching rectifier system and inverter without changing the motor terminal voltage and current.

Thus it is an object of the invention to permit more substantial leading power factor correction in low-speed operating regimes of the motor by using modulation index regulation for those lower speeds. Flux control may be used for lagging power factor correction at low speeds and both leading and lagging power factor correction at higher speeds, including over speeds or flux weakening speeds.

These particular objects and advantages may apply to only some embodiments falling within the claims and thus do not define the scope of the invention.

BRIEF DESCRIPTION OF THE DRAWINGS

FIG. 6 is a diagram showing phasor diagram for the correction of leading power factors;

FIG. 7 is a figure similar to that of FIG. 6 showing the phasor diagram for the correction of lagging power factors;

DETAILED DESCRIPTION OF THE PREFERRED EMBODIMENT

Figure 1:
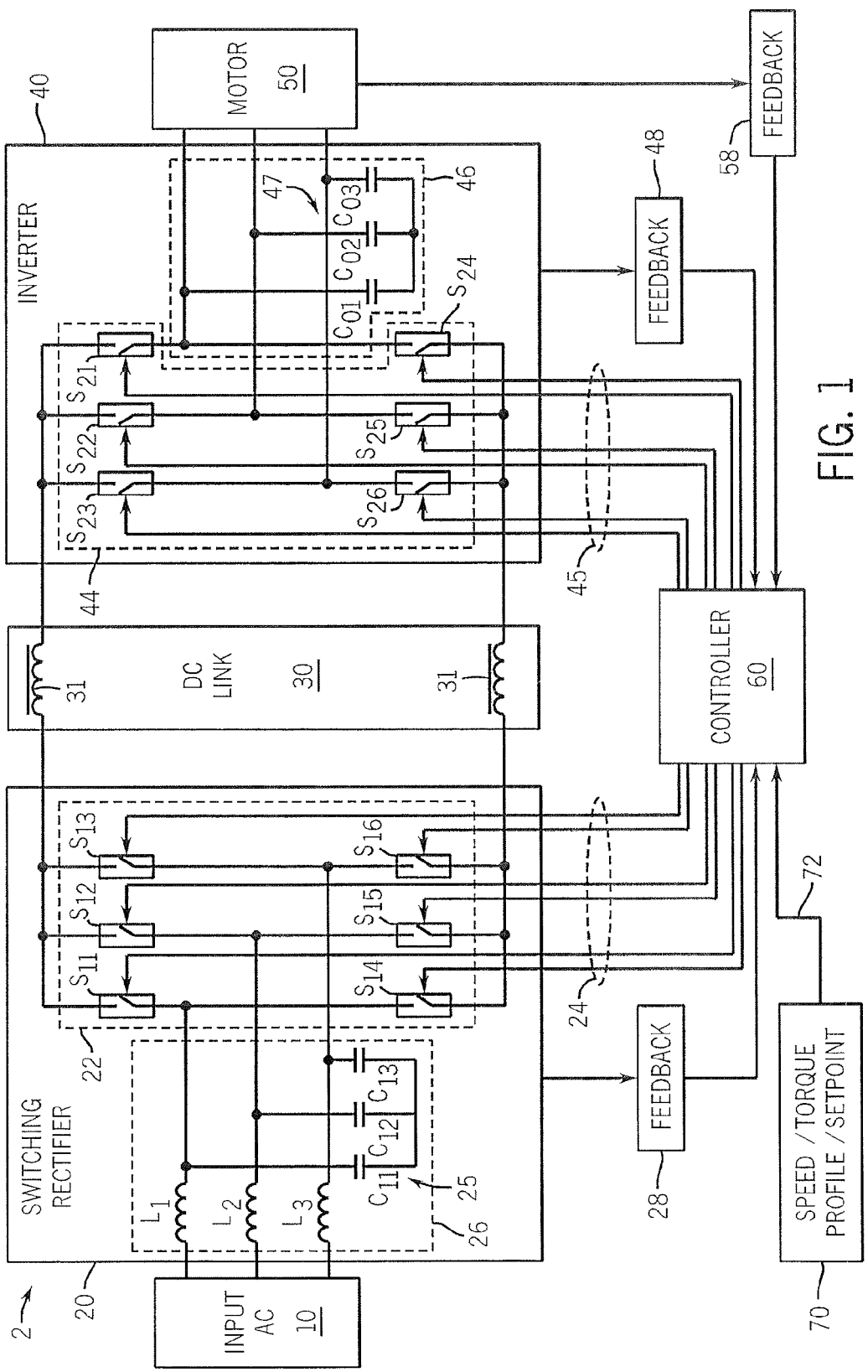
FIG. 1 is a block diagram of a motor drive having a switching rectifier and inverter operated by a controller to provide for power factor correction in the present invention.

Referring now to FIG. 1, a medium voltage current source motor drive system 2 in accordance with the present disclosure, receives input power from an AC power supply 10 and provides variable frequency AC power to a motor 50. The drive 2 includes a switching rectifier 20 with input filter 26 and a set of rectifier switches 22 operable according to a first set of switch control signals 24 from a controller 60 to provide DC link current to an intermediate DC link 30 having link chokes or inductors 31. The DC link current is provided via the link inductors 31 to a current source type switching inverter 40 that selectively switches the DC current according to a second set of switch control signals 45 from the controller 60 to power the motor 50.

The rectifier 20 includes a first set of switches 22, $S_{11}$, $S_{12}$, $S_{13}$, $S_{14}$, $S_{15}$, and $S_{16}$, which may be any suitable type of semiconductor-based switching devices, such as gate-turnoff thyristors (GTOs), Symmetric Gate Commutated Thyristors (SGCT), etc. In the illustrated example, six switches 22 are shown, with three upper switches $S_{11}$, $S_{12}$, and $S_{13}$ connected between input filter inductors $L_1$, $L_2$, and $L_3$ and an upper DC bus terminal of the link inductors 31, as well as three lower switches $S_{14}$, $S_{15}$, and $S_{16}$ coupled between the inductors $L_1$, $L_2$, and $L_3$ and a lower DC link choke terminal. Alternative embodiments are possible in which any suitable number of switching devices are provided in the first set of switches 22, such as where multiple switches are provided in each of the six circuit branches, or wherein fewer or more phases are provided, with corresponding switches 22 being provided to selectively connect the individual input lines with the DC link bus terminals.

In operation, the first set of switches 22 are selectively actuated through one or more pulse width modulation (PWM) techniques according to corresponding switch control signals 24 from the controller 60 to couple the AC input connections with one or the other of the DC bus terminals of the link inductors 31, where the timing of the device switching determines the power conversion performance of the rectifier 20 in providing the DC link current. In one exemplary implementation, the rectifier 20 is controlled using selective harmonic elimination (SHE) although any suitable switching technique can be used.

The AC power supply 10 in the illustrated implementation is three-phase, wherein the rectifier 20 includes input filter 26, including input capacitors 25 ($C_{11}$, $C_{12}$, and $C_{13}$) connected in line-to-neutral fashion, as well as in-line phase inductors $L_1$, $L_2$, and $L_3$. Alternate embodiments are possible in which the filter capacitors 25 can be connected in a line-to-line configuration, where additional components of the filter 26 are provided at the rectifier input (e.g., line-to-neutral and line-to-line capacitors, etc.), where the phase inductors $L_1$, $L_2$, and $L_3$ may be omitted, and/or where the AC power supply 10 is single phase or any number of phases, wherein the present invention is not limited to the illustrated three-phase configuration.

The inventors have appreciated that the presence of the input filter capacitors 25 causes leading power factor at light loading conditions which can lead to instability in generators providing the AC power supply 10 absent countermeasures for power factor correction provided by the exemplary controller 60 as further illustrated and described below.

The exemplary inverter 40 includes a second set of switching devices 44, which may be any type or form of electrical switches, including without limitation those mentioned above in connection with the switches 22, wherein the illustrated implementation provides three upper switches $S_{21}$, $S_{22}$, and $S_{23}$ connected between the upper output terminal of the inductors 31 and the corresponding motor leads, and three lower switches $S_{24}$, $S_{25}$, and $S_{26}$ coupled between the motor leads and a lower DC link choke output terminal. As with the first set of switches 22 of the rectifier 20, the second set of switching devices 44 in the inverter 40 may include different numbers of switches and different configurations thereof, wherein the present disclosure is not limited to the illustrated example of FIG. 1.

In addition, the inverter 40 and/or the motor 50 itself may provide output capacitors 46, in this example, line-to-neutral connected output capacitors 47 ($C_{O1}$, $C_{O2}$, and $C_{O3}$) wherein the controller 60 operates the switching devices 44 using one or more forms of pulse-width-modulation, such as space vector modulation (SVM), selective harmonic elimination (SHE), or combinations thereof in certain suitable embodiments. In the exemplary implementation, the controller 60 employs space vector modulation for lower speeds with SHE being used in an upper speed range for pulse width modulation control of the second switching devices 44 in the inverter 40.

The controller 60 provides the first and second sets of switch control signals 24 and 45 to the rectifier 20 and inverter 40, respectively, and operates in closed loop fashion using feedback information 28, 48, and 58 from the rectifier 20, inverter 40, and motor 50, respectively, to control the motor operation according to command signals 70 provided as an input 72. The controller 60 may employ any suitable form of closed or open loop control of the various power conversion components of rectifier 20, and inverter 40, which may include multiple control loops so as to regulate the speed and/or torque of the motor 50 at or near a desired command signal 70 such as one or more setpoint values or a series of such values forming a profile (e.g., a speed profile during motor startup, etc.), which command signal 70 is provided as an input 72 to the controller 60. In medium voltage motor drive applications, moreover, the controlled switch activations in the inverter 40 provide variable frequency, variable amplitude, and multi-phase AC output power from the DC link to the motor windings to control one or more motor operating parameters (e.g., speed, torque, angle, etc.) across wide ranges.

The rectifier feedback 28 from the switching rectifier 20 may include line voltage, current, frequency, phase or other information related to the AC power provided by the AC power supply 10 to facilitate power factor correction (PFC) type control in the drive 2 to mitigate the above mentioned undesirable effects of extreme leading or other non-unity power factor, particularly for generator operated applications at light loading conditions (e.g., at low motor speeds with a fan/pump type load, etc.). In addition, the rectifier feedback 28 may include values indicating the current and/or voltage levels associated with the DC link output of the rectifier 20 by which the DC link current can be regulated by the controller 60 in closed loop fashion via the first set of switch control signals 24. The controller 60 also receives feedback information 48 from the switching inverter 40, which may include without limitation voltage, current, frequency, phase or other information related to the AC output power provided to the motor 50 so the controller 60 can provide the inverter switch control signals 45 to regulate the operation of the motor 50 in a controlled fashion. The controller 60, moreover, may receive feedback information 58 from the motor 50 itself or sensors, transducers, etc. associated therewith, for example, motor winding temperatures, voltages, currents, rotor speed values, motor flux values or any other information related to the motor or the current operating condition thereof. This information may further include parameter information, for example, relating to various physical constant drive systems including the motor, for example, the value of output capacitance, and physical motor constants.

Figure 2:
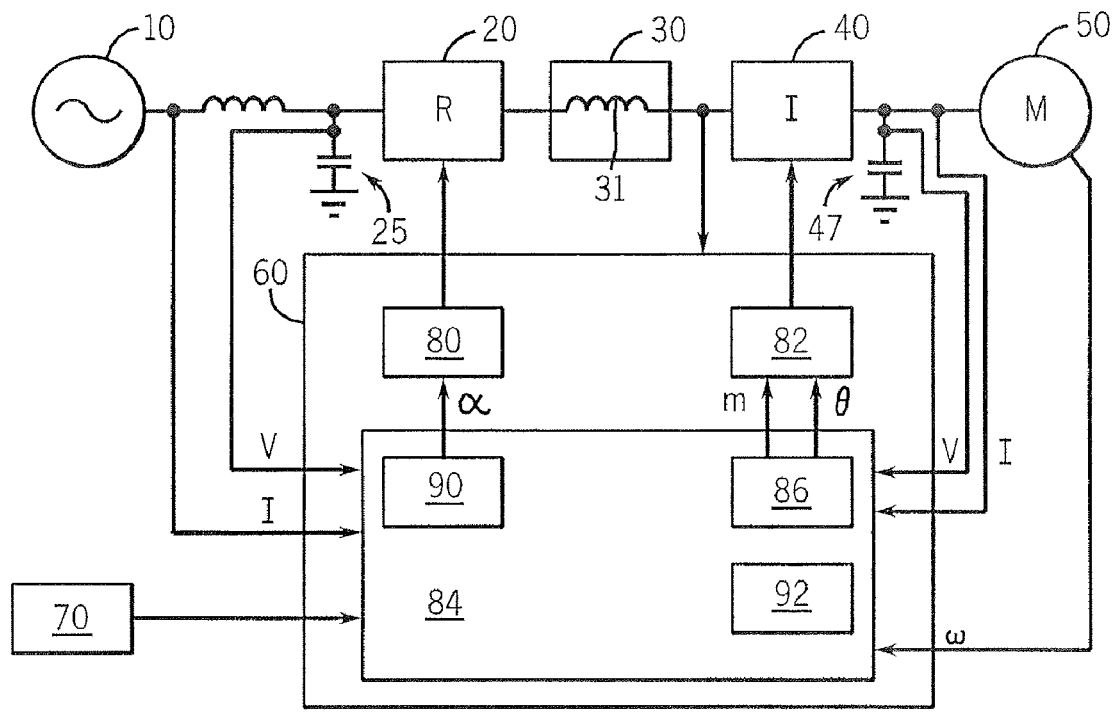
FIG. 2 is a schematic diagram illustrating further details of the controller including a standard motor control processor together with a modulation index regulation and flux control program implementing power factor correction.

Referring now to FIG. 2, the controller 60 may provide a rectifier modulation system 80 and an inverter modulation system 82 providing modulation signals to the rectifier 20 and inverter 40, respectively, based on modulation angles α and θ and modulation index m respectively as are understood in the art.

When power factor correction is not desired, modulation angles α and θ, and modulation index m are produced directly by a motor control system 84 receiving the feedback signals of voltage from the input capacitors 25, DC link current through inductors 31, output voltage across output capacitors 47, and current and the motor rotational speed according to techniques understood in the prior art. The motor control system 84 uses this feedback data to calculate a number of internal parameters including, for example, motor speed (ω), motor torque (T), and motor flux (F) as are also understood in the art. The motor control system 84 receives a command signal 70 as well as various fixed parameters related to the static physical properties of the motor, for example the magnetizing inductance ($L_m$) and constants such as ($K_T$) providing a conversion factor between motor and torque systems in order to effect the standard control.

When power factor correction is desired, the operating program of the motor control system 84 is augmented with one or more of three power factor correction programs 86, 90, and 92 to modify the production of modulation angles α and θ and modulation index m. Power factor correction programs 90 and 86 implement a modulation index regulation technique and produce both the modulation angle α for the rectifier modulation system 80 and modulation index m for the inverter modulation system 82. In contrast, power factor correction program 92 implements a flux control technique to produce a modified flux value that is used by the motor control system 84 in producing both the modulation angle θ and the modulation angle α.

Generally, motor control system 84 switches between modulation index regulation of power factor correction program 90 and 86 and the flux control of power factor correction program 92 based on the drive's input power factor and motor speed ω. Normally modulation index regulation is used at low motor speeds for leading power factor compensation and flux control is used at high motor speeds or even over speed range for both leading and lagging power factor corrections. The flux control may also be used for lagging power factor compensation at low speeds, where the modulation index regulation is not effective. For a fan/pump type load, usually light loading conditions happen at low speeds, and heavy loading conditions happen at high speeds. In this case, the modulation index regulation is used at low speeds and flux control is used at high motor speeds.

Figure 8:
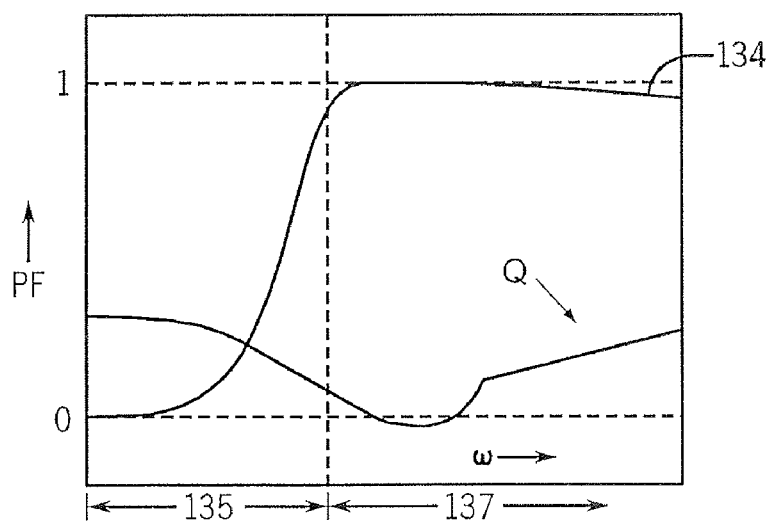
FIG. 8 is a graph showing typical power factor changes as a function of motor speed without correction, where a fan/pump type load is used.

Referring momentarily to FIG. 8, a predetermined motor speed ω is selected to define a low range 135 and a high range 137. The low range 135 is one where relatively large power factor correction may be required but the power factor 134 is often leading and where changes in modulation of the inverter can be effected. This range is handled by power factor correction programs 90 and 86. However, this low speed range 135 is not restricted to power factor correction programs 90 and 86. In case of a lagging power factor at this low range 135 (e.g. a huge constant torque load is applied), power factor correction program 92 can be used to compensate the lagging power factor. The high range 137, including overspeed range or flux weakening range, is one where relatively smaller power factor corrections are required but the power factor 134 may be either leading or lagging and where changes in modulation of the inverter may be prohibited for example during SHE modulation. This range is handled by power factor correction program 92.

Figure 3:
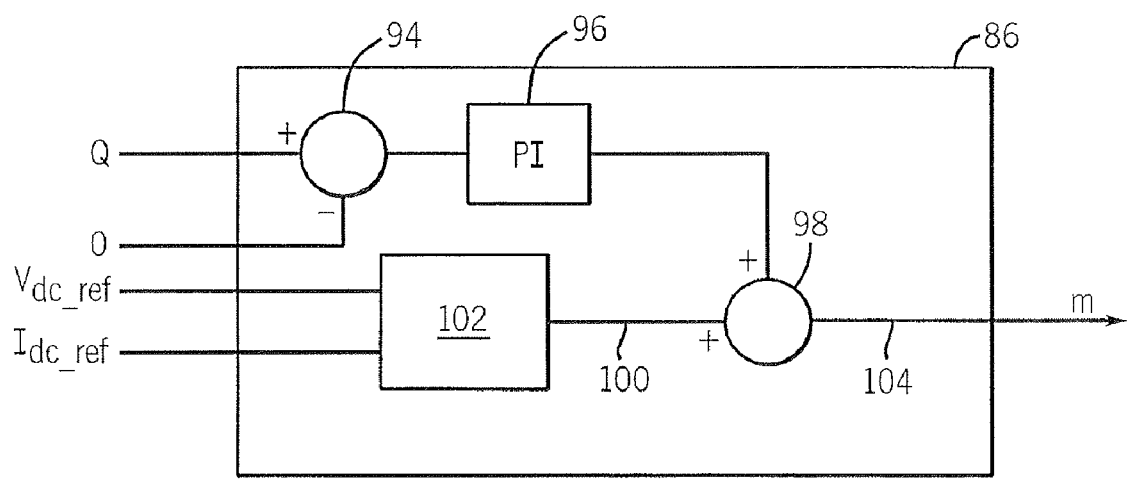
FIG. 3 is a schematic diagram showing details of the modulation index regulation program control of the switching inverter.

Referring now to FIG. 3, the power factor correction program 86 may receive a value Q being the reactive power of the motor drive 2 as seen from the AC power supply 10 and as may be derived generally from the monitored current and voltage input to the motor drive 2. The power factor is unity when Q is equal to zero, it is leading if Q is larger than zero and it is lagging when Q is smaller than zero. The power factor correction program 86 also receives a desired reactive value, in this case zero. In addition the power factor correction program 86 may receive a DC reference voltage $V_{dc\text{-}ref}$ and DC reference current $I_{dc\text{-}ref}$ representing the nominal DC link voltage and current calculated by motor control system 84 with assumption of no modulation index regulation.

The difference between Q and the desired value (0) is determined by summing junction 94 and provided as an input to a proportional integral (PI) controller 96. The output of the controller 96 is then provided to a summing junction 98 which adds this output to a modulation index 100 (as will be described), the modulation index 100 selected to produce a compensating current moving the power factor to unity. The resulting modulation index 104 ($m$) is then used to control the inverter 40 through inverter modulation system 82.

This modulation index 100 described above may be determined from the reference voltage and current as follows and may be optionally used in the power factor correction program 86 as a modulation index feedforward loop as indicated in FIG. 3 as block 102:

$$m_{ffd} = \frac{1}{\sqrt{\frac{V_C^2 C_{IN}^2}{I_{dc\_ref}^2} + V_{dc\_ref}^2}} \tag{1}$$

where $V_C$ is the input voltage measured across capacitors 25 and $C_{IN}$ is the values of capacitors 25.

Figure 4:
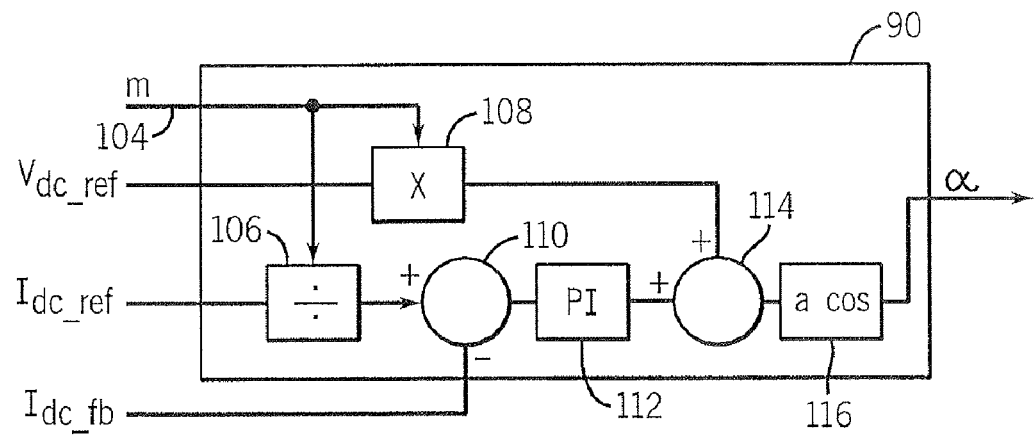
FIG. 4 is a schematic diagram showing details of the modulation index regulation program for switching angle ($\alpha$) control of the rectifier when modulation index regulation control is enabled for the switching inverter.

Referring now to FIG. 4, the modulation index 104 is also received by the power factor correction program 90 to provide a coordinating modulation angle $\alpha$ for the rectifier modulation system 80. In this case, the modulation index 104 is used to divide the reference current $I_{dc\text{-}ref}$ and multiplies the reference voltage $V_{dc\text{-}ref}$ normally computed by the motor control system 84 as indicated by divider 106 and multiplier 108 respectively.

The ratio of the modulation index 104 and the reference current $I_{dc\text{-}ref}$ is next provided to summing block 110 and feedback current $I_{dc\text{-}fb}$ subtracted from it at summing block 110. Feedback current $I_{dc\text{-}fb}$ measures the DC link current and thus the energy stored in the DC link 30. This difference is provided to a proportional integral (PI) controller 112 whose output is summed at summing block 114 with the product of the modulation index 104 and the DC reference voltage $V_{dc\text{-}ref}$. This sum is received by a cosine converter 116 (performing arc cosine and scaling function) to provide the modulating angle $\alpha$.

The effect of the power factor correction program 86 and 90 is to change the modulation of the rectifier 20 and inverter 40 and directly move energy into and out of the DC link 30 to create compensating currents that promote a unity power factor.

The change in modulation affects the change in Q (and thus the change in the power factor) as follows:

$$\begin{cases} m\uparrow, I_{dc}\downarrow, V_{dc}\uparrow \alpha\downarrow \Rightarrow Q\uparrow \\ m\downarrow, I_{dc}\uparrow, V_{dc}\downarrow \alpha\uparrow \Rightarrow Q\downarrow \end{cases} \tag{2}$$

Figure 5:
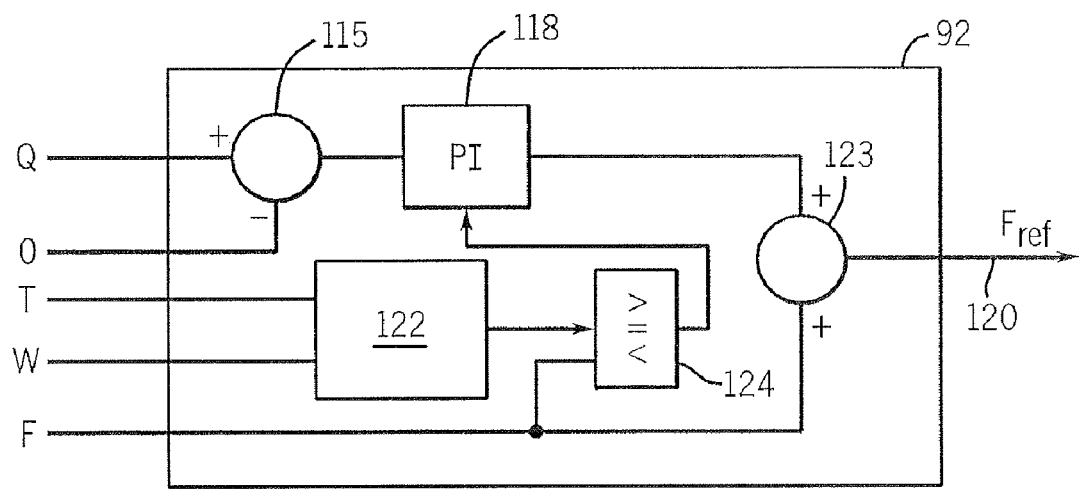
FIG. 5 is a schematic diagram showing details of the flux control program for control of the motor flux when flux control is enabled.

Referring now to FIG. 5, power factor correction program 92 also receives the value of Q which is compared to a desired reactive power (0) at summing block 115 and the difference is provided to a PI controller 118. The output of this PI controller 118 may be optionally summed with the motor flux F at summing block 123, whose output is used to provide motor flux reference $F_{ref}$ 120 for the standard motor control system 84 to generate the modulation angles $\alpha$ and $\theta$ to change the motor flux field. Doing this can indirectly change the energy in DC link and thereby create a desired compensating current that corrects for the power factor error.

This PI controller 118 is designed to deal with the non-monomial relationship of motor flux and drive's input power factor. This function is achieved through changing the PI controller sign by comparing the motor flux to a threshold value calculated at process block 122 as follows:

$$F_0 = \sqrt[4]{\frac{\frac{T^2(1-\omega^2 C_o L_\sigma)^2 + (\omega C_o R_s T)^2}{(K_T L_{m\_r})^2}}{\left(\frac{\omega C_o R_s}{L_m}\right)^2 + \left(\frac{1-\omega^2 C_o L_\sigma}{L_m} - \omega^2 C_o L_{m\_r}\right)^2}} \tag{3}$$

or approximately $F_0 = \sqrt{\dfrac{|T|}{K_T\left|\dfrac{1}{L_m} - \omega^2 C_0\right|}}$ where $C_0$ is the value of output capacitors 47. $L_{m\_r}$, $L_\sigma$, $R_S$ are various fixed parameters related to the static physical properties of the motor. At comparison block 124 this flux threshold value is evaluated to determine whether the PI flux controller should increase or decrease the motor flux for power factor correction:

$$\begin{aligned} F < F_0 &\Rightarrow \begin{cases} F\uparrow \Rightarrow Q\uparrow \\ F\downarrow \Rightarrow Q\downarrow \end{cases} \\ F > F_0 &\Rightarrow \begin{cases} F\uparrow \Rightarrow Q\downarrow \\ F\downarrow \Rightarrow Q\uparrow \end{cases} \end{aligned} \tag{4}$$

Generally in cases of leading power factor (a capacitive reactive power with Q>0) if the flux is less than the threshold value $F_0$, then the flux may be decreased to bring the value of Q to zero by setting negative gains for PI controller 118. If the flux is larger than the threshold value, then the flux may be increased to bring the value of Q to zero by setting positive gains for controller 118. In the case of lagging power factor (and inductive reactive power with Q<0), the flux can be controlled in a similar fashion by properly setting PI controller gains to be positive or negative according to whether the motor flux is larger or less than the threshold value $F_0$. As in most operating conditions, the motor flux may be smaller than the threshold value $F_0$, it is also reasonable to disable the PI controller 118 (by setting controller gains to zero) when motor flux is larger than the threshold to prevent controlling the power factor to the wrong direction. When the PI controller 118 is disabled, its last output value may be held on its output and the internal integrator stopped to prevent "windup".

Referring now to FIG. 6, when the motor drive 2 would promote a leading power factor as shown by vector diagram 130, the present invention may directly control the DC link current by using modulation index regulation to neutralize the leading current $I_C$ (current in the input capacitor 25) by producing a current $I_m$ and/or may adjust the magnetic flux of the motor 50 to produce a current $I_{flux}$ that together sums with the previous DC link current $I_{link1}$ (which is equal to the rectifier input PWM current with a rectifier gain of unity) The final DC link current $I_{link}$ sums the leading current $I_C$ will generate a line current $I_S$ aligned with the line voltage $V_C$. As both the modulation index regulation method and the flux adjustment method will not change the real power input of the drive system, the vector $I_m$ and $I_{flux}$ will be perpendicular to the line voltage $V_C$ as shown in vector diagram 130.

As shown in FIG. 7, in the case of a lagging power factor (the input capacitor current is over-compensated by the DC link current $I_{link1}$), shown by vector diagram 132, compensating current is attained solely as $I_{flux}$ which is generated by controlling the magnetic flux from motor 50.

Referring to FIG. 8, without compensation, in low-speed region 135, a power factor 134 may vary widely from zero to nearly one for low-speed operation of the motor 50 based on the dominant effect of the capacitors 25 compared to the motor current draw. At high-speed region 137, the power factor 134 of the motor drive 2 may become slightly lagging and then fall to a slightly leading value.

Figure 9:
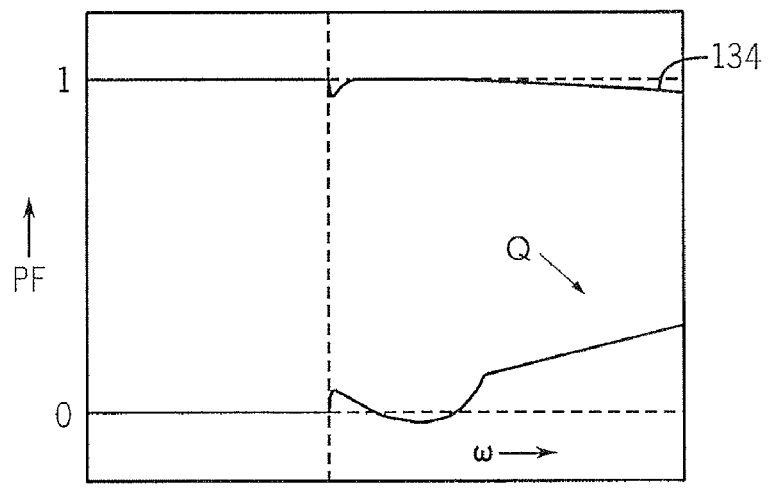
FIG. 9 is a graph similar to that of FIG. 8 showing power factor correction using modulation index regulation alone, where a fan/pump type load is used.

Referring to FIG. 9, modulation index regulation alone provides for some power factor correction in low-speed region 135 but cannot perform power factor correction in high-speed region 137 when SHE modulation is used and when lagging power factors may occur.

Figure 10:
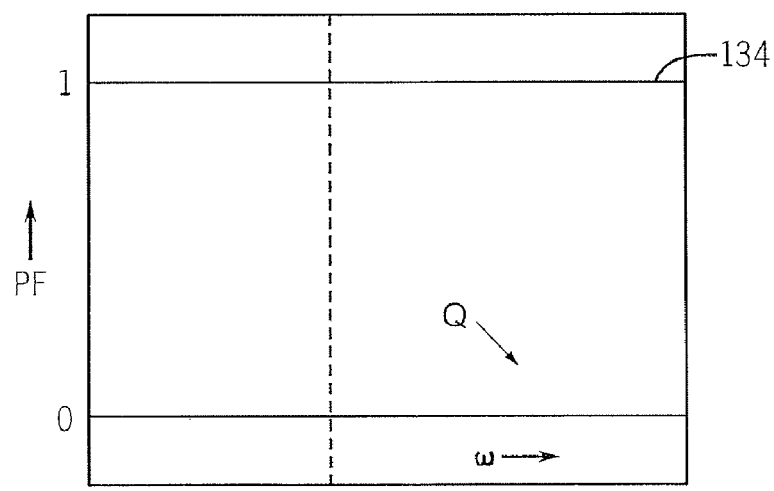
FIG. 10 is a graph similar to those of FIGS. 8 and 9 showing power factor correction with modulation index regulation and flux control, where a fan/pump type load is used.

Referring to FIG. 10, a combination of modulation index regulation and flux control provides improved regulation over a wide range of motor speeds in regions 135 and 137.

It is specifically intended that the present invention not be limited to the embodiments and illustrations contained herein, but include modified forms of those embodiments including portions of the embodiments and combinations of elements of different embodiments as come within the scope of the following claims.

We claim:

1. A motor drive system providing power factor compensation and comprising:
   a switching rectifier system receiving a source of AC power to selectively couple the AC power with an intermediate DC link to provide a DC link current or voltage;
   an inverter coupled to the DC link to receive the DC link current or voltage and to synthesize an AC output current or voltage to a motor;
   a controller coupled to the switching rectifier system and the inverter and executing a stored program to:
   (1) receive an operating command describing a desired operating point of the motor;
   (2) determine a power factor of the motor drive at the desired operating point;
   (3) determine a compensating current tending to correct the power factor to a desired value;
   (4) generate an AC output current and voltage to the motor providing the desired operating point of the motor and also producing the compensating current by changing the magnitude of the motor flux within a certain range.

2. The motor drive system of claim 1 wherein the compensating current corrects a lagging power factor.

3. The motor drive system of claim 2 wherein in step (4) the controller determines whether the current magnetic flux of the motor is less than a threshold value, increasing the flux if a current magnetic flux of the motor is less than the threshold value and decreasing the flux otherwise.

4. The motor drive system of claim 3 wherein the increasing and decreasing is done by a closed loop integrating control process.

5. The motor drive system of claim 3 wherein the threshold value is equation:

$$F_0 = \sqrt[4]{\frac{\frac{T^2(1-\omega^2 C_o L_\sigma)^2 + (\omega C_o R_s T)^2}{(K_T L_{m\_r})^2}}{\left(\frac{\omega C_o R_s}{L_m}\right)^2 + \left(\frac{1-\omega^2 C_o L_\sigma}{L_m} - \omega^2 C_o L_{m\_r}\right)^2}}$$

or approximately $F_0 = \sqrt{\dfrac{|T|}{\sqrt{K_T \left|\dfrac{1}{L_m} - \omega^2 C_0\right|}}}$.

6. The motor drive system of claim 1 wherein the compensating current corrects a leading power factor.

7. The motor drive system of claim 6 wherein in step (4) the controller determines whether the current magnetic flux of the motor is less than a threshold value, decreasing the flux if a current magnetic flux of the motor is less than the threshold value and increasing the flux otherwise.

8. The motor drive system of claim 7 wherein the increasing and decreasing is done by a closed loop integrating control process.

9. The motor drive system of claim 7 wherein the threshold value is $F_0$ and $$F_0 = \sqrt[4]{\frac{\frac{T^2(1-\omega^2 C_o L_\sigma)^2 + (\omega C_o R_s T)^2}{(K_T L_{m\_r})^2}}{\left(\frac{\omega C_o R_s}{L_m}\right)^2 + \left(\frac{1-\omega^2 C_o L_\sigma}{L_m} - \omega^2 C_o L_{m\_r}\right)^2}}$$

or approximately $F_0 = \sqrt{\dfrac{|T|}{\sqrt{K_T \left|\dfrac{1}{L_m} - \omega^2 C_0\right|}}}$.

10. The motor drive system of claim 1 further including the step of (5) generating a compensating current by directly changing the magnitude of current stored in the DC link as controlled by the switching rectifier system and inverter without changing the motor terminal voltage and current.

11. The motor drive system of claim 1 further including the step of sensing a motor speed and generating the compensating current for leading power factor only when the motor speed is above a predetermined speed.

12. The motor drive system of claim 11 further including the step (5) generating a compensating current for leading power factor by directly increasing the magnitude of current stored in the DC link as controlled by the switching rectifier system and inverter without changing the motor terminal voltage and current, when the motor speed is below the predetermined speed.

13. The motor drive system of claim 12 further including the step of generating a compensating current correcting lagging power factor by changing the magnitude of motor flux within a certain range, when the motor speed is below the predetermined speed.

14. The motor drive system of claim 13 further including the step of generating a compensating current correcting either leading power factor or lagging power factor by changing the magnitude of the motor flux within a certain range, when the motor speed is above the predetermined speed.

15. A method of correcting power factor in a motor drive system having a switching rectifier system receiving a source of AC power to selectively couple the AC power with an intermediate DC link to provide a DC link current or voltage, an inverter coupled to the DC link to receive the DC link current or voltage and to synthesize an AC output current or voltage to a motor, and a controller coupled to the switching rectifier system and the inverter comprising the steps of:

(1) receiving an operating command describing a desired operating point of the motor;
(2) determining a power factor of the motor drive at the desired operating point;
(3) determining a compensating current tending to correct the power factor to a desired value;
(4) generating an AC output current or voltage to the motor providing the desired operating point of the motor and also producing the compensating current by changing the magnitude of the motor flux within a certain range.

16. The method of claim 15 wherein the compensating current corrects a lagging power factor.

17. The method of claim 16 wherein at step (4) the controller determines whether the current magnetic flux of the motor is less than a threshold value, increasing the flux if a current magnetic flux of the motor is less than the threshold value and decreasing the flux otherwise.

18. The method of claim 15 wherein the step of determining the power factor may determine a leading power factor and the compensating current may tend to correct the leading power factor.

19. The method of claim 18 wherein in step (4) the controller determines whether the current magnetic flux of the motor is less than a threshold value, decreasing the flux if a current magnetic flux of the motor is less than the threshold value and increasing the flux otherwise.

20. The method of claim 15 further including the step (5) generating a compensating current by directly changing the magnitude of current stored in the DC link as controlled by the switching rectifier system and inverter without changing the motor terminal voltage and current.

21. The method of claim 15 further including the step of sensing a motor speed and performing step (3) for leading power factor correction only when the motor speed is above a predetermined speed.

22. The method of claim 21 further including the step (5) generating a compensating current for leading power factor by directly increasing the magnitude of current stored in the DC link as controlled by the switching rectifier system and inverter without changing the motor terminal voltage and current, when the motor speed is below the predetermined speed.

* * * * *